(12) United States Patent
Kim et al.

(10) Patent No.: US 8,858,054 B2
(45) Date of Patent: Oct. 14, 2014

(54) EDGE-TYPE LED LIGHTING DEVICE HAVING A HIGH LUMINOUS EFFICIENCY DESPITE THERMAL EXPANSION OF THE LIGHTGUIDE PLATE

(75) Inventors: Seog Joon Kim, Cheonan-si (KR); Mee Suk Rho, Seongnam-si (KR); Taek Kyu Kim, Seongnam-si (KR); Kazuhiro Kashiwagi, Hamamatsu (JP); Isao Koike, Hamamatsu (JP); Kunitoshi Shimizu, Hamamatsu (JP); Akira Ikemoto, Hamamatsu (JP)

(73) Assignees: Techsign Light Panel Co., Ltd., Chungcheongnam-do (KR); Kowa Company, Ltd., Nagoya-Shi, Aichi (JP)

( * ) Notice: Subject to any disclaimer, the term of this patent is extended or adjusted under 35 U.S.C. 154(b) by 0 days.

(21) Appl. No.: 14/002,101

(22) PCT Filed: Feb. 28, 2012

(86) PCT No.: PCT/KR2012/001480
§ 371 (c)(1),
(2), (4) Date: Aug. 28, 2013

(87) PCT Pub. No.: WO2012/118314
PCT Pub. Date: Sep. 7, 2012

(65) Prior Publication Data
US 2013/0336008 A1 Dec. 19, 2013

(30) Foreign Application Priority Data
Mar. 1, 2011 (JP) .................................. 2011-043666
Apr. 11, 2011 (KR) ........................ 10-2011-0033203

(51) Int. Cl.
| F21S 8/06 | (2006.01) |
|---|---|
| F21V 19/00 | (2006.01) |
| F21K 99/00 | (2010.01) |
| F21V 8/00 | (2006.01) |
| F21Y 101/02 | (2006.01) |
| F21Y 105/00 | (2006.01) |
| F21Y 103/00 | (2006.01) |

(52) U.S. Cl.
CPC ............... *G02B 6/0011* (2013.01); *F21S 8/061* (2013.01); *F21Y 2101/02* (2013.01); *F21V 19/003* (2013.01); *F21S 8/063* (2013.01); *F21K 9/00* (2013.01); *G02B 6/0091* (2013.01); *F21V 19/004* (2013.01); *F21Y 2105/00* (2013.01); *F21Y 2103/003* (2013.01)
USPC ........................ 362/612; 362/249.03; 362/382

(58) Field of Classification Search
USPC ........................ 362/249.03, 249.02, 612, 382; 361/679.27, 679.09
See application file for complete search history.

(56) References Cited

U.S. PATENT DOCUMENTS

| 2009/0097277 A1* | 4/2009 | Iwasaki ......................... 362/628 |
| 2009/0237957 A1* | 9/2009 | Tsubaki ......................... 362/615 |

(Continued)

FOREIGN PATENT DOCUMENTS

KR 0552589 2/2006

(Continued)

OTHER PUBLICATIONS

International Search Report, mailing date Oct. 23, 2012, for corresponding International Application No. PCT/KR2012/001480 with English translation.

*Primary Examiner* — Tracie Y Green
(74) *Attorney, Agent, or Firm* — Intellecutal Property Law Group LLP

(57) ABSTRACT

The present invention relates to an edge-type lighting device using an LED light source which has high light-emitting efficiency regardless of thermal expansion of a light guide plate. An LED light source (3) is disposed on an edge of a light guide plate (2) so as to be movable in the normal line direction (±n) of the edge (2c) of the light guide plate. A slide member (7) is slidably disposed on the rear surface of the LED light source. A spring (8) is disposed in a frame member (4) on the rear surface of the slide member. Thus, the LED light source can always be pressed toward the edge of the light guide plate regardless of the thermal expansion of the light guide plate. Because the spring has a simple structure, the lighting device can be compact compared to the case where a coil spring is used.

14 Claims, 4 Drawing Sheets

(56) References Cited

U.S. PATENT DOCUMENTS

2012/0281151 A1* 11/2012 Abe ............................... 348/739
2012/0293715 A1* 11/2012 Kasai ............................ 348/725
2012/0293727 A1* 11/2012 Yoshikawa ................... 348/739

FOREIGN PATENT DOCUMENTS

| | | |
|---|---|---|
| KR | 2010 0006091 | 6/2010 |
| KR | 2010 0061326 | 6/2010 |
| KR | 2010 0124320 | 11/2010 |

* cited by examiner

EDGE-TYPE LED LIGHTING DEVICE HAVING A HIGH LUMINOUS EFFICIENCY DESPITE THERMAL EXPANSION OF THE LIGHTGUIDE PLATE

CROSS-REFERENCE TO RELATED APPLICATIONS

This application is a U.S. National Phase application, under 35 U.S.C. §371, of International Application No. PCT/KR2012/001480, with an international filing date of Feb. 28, 2012, and claims benefit of Japan Application No. 2011-043666 filed on Mar. 1, 2011 and of Korean Application No. 10-2011-0033203 filed on Apr. 11, 2011, and which are hereby incorporated by reference for all purposes.

TECHNICAL FIELD

The present invention relates to a structure of a lighting device.

BACKGROUND ART

In recent years, LEDs having superior energy saving characteristics have been spotlighted in lieu of light bulbs or fluorescent lamps. Furthermore, various structures of lighting devices using LEDs are also being proposed (for example, Patent document 1).

FIG. 9 is a sectional view illustrating an embodiment of a conventional structure of an edge-type lighting device. In the drawing, reference numeral 202 denotes a light guide plate made of a transparent material, and reference numeral 203 denotes light sources which are disposed facing each other on respective edges of the light guide plate 202 and emit light L1 into the light guide plate 202. The lighting device is configured such that light L1 that is emitted from the light source 203 and enters the light guide plate 202 is emitted from a front surface of the light guide plate 202 (see reference numeral L2). In the edge-type lighting device having the above-mentioned construction, the light sources 203 can be disposed on the edges of the light guide plate 202 rather than on a rear surface of the light guide plate 202. Therefore, the edge-type lighting device can be markedly reduced in thickness. Such an edge-type lighting device is mounted to a ceiling, a sidewall, etc. of a room or the like.

Meanwhile, a variety of structures that pertain to conventional lighting devices using light bulbs, fluorescent lamps or LEDs have been proposed (for example, Patent document 2).

FIG. 10 is a perspective view showing an embodiment of the structure of such a conventional lighting device. Reference numeral 301 denotes a light source unit which has an approximate rectangular surface and is configured such that light L2 is emitted from the rectangular surface. Reference numeral 302 denotes a frame member which is disposed at a rear surface of the light source unit 301, and reference numeral 303 denotes suspension pipes which suspend the lighting device from a ceiling.

SUMMARY OF THE INVENTION

Technical Problem

The edge-type lighting device illustrated in FIG. 9 is configured in such a way that the LED light sources 203 are fixed to the frame member 204. Therefore, when the light guide plate 202 is expanded by heat generated from the LED light source 203, there is a possibility of the LED light sources 203 being pressed between the light guide plate 202 and the frame member 204. Although edge-type lighting devices are used as backlight units for liquid crystal (LC) TVs or LC monitors, when edge-type lighting devices are used as original lighting devices rather than as backlight units, a lot of attention is required with regard to expansion of the light guide plate 202, because the quantity of light emitted from the LED light source 203 is increased and thus the heat generation rate is also increased.

Meanwhile, in the case of the lighting device of FIG. 10, although the frame member 302 is required to connect the suspension pipes to the lighting device, because the frame member 302 is disposed on the rear surface of the light source unit 301 and covers the entirety of the rear surface, there is a problem in that the weight of the lighting device is increased. If the frame member is configured such that it covers a portion of the rear surface of the light source unit 301 so as to reduce the weight of the lighting device, rather than covering the entirety of the rear surface, the installation positions of the suspension pipes 303 are limited to where the frame member is present. In other words, the installation positions of the suspension pipes 303 cannot be easily changed.

Accordingly, the present invention has been made keeping in mind the above problems occurring in the prior art, and an object of the present invention is to provide an edge-type lighting device using an LED light source which is configured such that the light-emitting efficiency thereof can be maintained at a high level regardless of thermal expansion of a light guide plate.

Technical Solution

In order to accomplish the above object, in an aspect, the present invention provides a lighting device, comprising: a light guide plate made of a transparent material; an LED light source disposed to face at least one of edges of the light guide plate, the LED light source emitting light into the light guide plate; and a frame member disposed to enclose both at least a portion of the light guide plate and at least a portion of the LED light source and receiving the portions therein, wherein when, among the edges of the light guide plate, an edge that faces the light source is referred to as a [light-source facing edge], the frame member has a pair of inner surfaces extending parallel to a normal line direction of the light-source facing edge, with a receiving space defined between the inner surfaces, the receiving space receiving the LED light source therein such that the LED light source can be movable in a normal line direction of the light-source facing edge, a slide member is disposed so as to be slidable in the normal line direction on a side of the LED light source that is opposite to a side (hereinafter referred to as a [light source front side] at which the light guide plate is disposed, the slide member having slide surfaces respectively coming into contact with the inner surfaces of the frame member, and a spring is provided between the slide member and the frame member while being compressed, the spring comprising: a first end in contact with the slide member; a second end in contact with the frame member; and a diagonal part disposed between the first end and the second end and provided to be inclined relative to the light-source facing edge, the diagonal part comprising a plate spring.

The LED light source may have a planar portion on a surface thereof corresponding to the light source front side, the planar portion coming into close contact with the light-source facing edge of the light guide plate.

The first end of the spring and the slide member may engage with each other such that an inclination angle of the diagonal part is maintained constant regardless of a location to which the slide member has slid.

The slide member may include a planar part having a cantilever shape, the planar part being configured in such a way that a first end thereof is supported on the slide member while a second end thereof protrudes from the slide member, and the first end of the spring may be fitted over the planar part and supported by the planar part.

The slide member and the LED light source may come into contact with each other at at least three points.

Each of the frame member and the slide member may be made of a material having high thermal conductivity, and the frame member and the slide member may be brought into surface contact with each other.

In another aspect, the present invention provides a lighting device, comprising: a light source unit having a rectangular surface and configured such that light is emitted from the rectangular surface; and a pair of frame members disposed respectively enclosing two parallel edges of the light source unit having the rectangular surface, wherein the frame members respectively have depressions formed at a side of the lighting device that is opposite to the rectangular surface from which light is emitted in such a way that openings of the depressions face each other, each of the depressions extending in a longitudinal direction of the corresponding frame member, a bridge frame unit is provided between the frame members in such a way that both ends of the bridge frame unit are disposed in the respective depressions so as to be slidable, and when, among inner surfaces defining each of the depressions, an inner surface which is farthest from the opening and faces the opening is referred to as a [depression inner sidewall], and wherein each of the ends of the bridge frame unit includes a first protrusion coming into contact with a portion of the frame member other than a depression inner sidewall and preventing the bridge frame unit from entering the depression to a predetermined degree or more, whereby a space of a predetermined distance is defined between the depression inner sidewall and the end of the bridge frame unit, and a second protrusion coming into contact with a portion of the frame member and preventing the bridge frame unit from being removed from the depression.

When a portion of each of the frame members that defines the opening of the corresponding depression is referred to as an [opening edge] and an inner surface that is formed between the opening edge and the depression inner sidewall is referred to as a [depression side surface], the opening edge may be formed to protrude from the depression side surface, and when a surface of the frame member that is formed around the opening edge and faces the other frame member is referred to as an [outer surface of the opening edge], and a surface of the frame member that is formed around the opening edge and faces the depression inner sidewall of the frame member is referred to as an [inner surface of the opening edge], the first protrusion may be formed at a position making contact with the outer surface of the opening edge so that the bridge frame unit is prevented from entering the depression to a predetermined degree or more, and the second protrusion may be formed at a position making contact with the inner surface of the opening edge so that the bridge frame unit is prevented from being removed from the depression.

Advantageous Effects

According to the present invention, an LED light source that is disposed on an edge of the light guide plate is provided so as to be movable in a normal line direction of the edge rather than being fixed to the frame member. Therefore, even if the light guide plate is expanded by heat generated from the LED light source, the LED light source can be prevented from being pressed between the light guide plate and the frame member. Furthermore, because the LED light source is configured such that it is elastically pushed towards the light-source facing edge by a spring, the LED light source is brought into close contact with the light-source facing edge, whereby light emitted from the LED light source can be efficiently guided into the light guide plate, thus enhancing the light-emitting efficiency of the lighting device. In addition, the spring is configured such that a diagonal part that is provided to be inclined relative to the light-source facing edge generates pushing force. Therefore, the length of the spring (with respect to the normal line direction) can be reduced compared to those of other kinds of springs (for example, a coil spring). Thereby, the size of the frame member (in detail, the length of the frame member with respect to the normal line direction) can be reduced, thus improving the appearance of the lighting device. Furthermore, a slide member has slide surfaces which respectively make contact with a pair of inner surfaces of the frame member. The inner surfaces of the frame member and the slide surfaces of the slide member are maintained in the contact state while the slide member slides. Thus, the slide member can move parallel to the normal line direction of the light-source facing edge. As such, the spring can reliably push the LED light source in the direction parallel to the normal line direction despite having a simple structure. Even if the light guide plate is expanded by heat, the LED light source can be prevented from being undesirably tilted, whereby the light-emitting efficiency of the lighting device can be maintained at a high level.

Moreover, in the light device of the present invention, the LED light source makes surface contact with the light-source facing edge, thus further enhancing the light-emitting efficiency of the lighting device.

In addition, according to the present invention, the spring and the slide member can engage with each other such that an inclination angle of the diagonal part of the spring is maintained approximately constant regardless of the location to which the slide member has moved.

Furthermore, in the light device of the present invention, the spring and the slide member can be connected to each other merely by simple work of inserting a planar part of the slide member into the first end of the spring. After the connection between the spring and the slide member has been completed, the inclination angle of the diagonal part of the spring can be maintained approximately constant regardless of the location to which the slide member has moved.

Moreover, in the light device of the present invention, the LED light source along with the slide member moves parallel to the normal line direction. Therefore, even if the light guide plate is expanded by heat, the LED light source can be prevented from being undesirably tilted, whereby the light-emitting efficiency of the lighting device can be maintained at a high level.

Further, in the light device of the present invention, heat of the LED light source can be efficiently transferred from the slide member to the frame member, whereby the heat dissipation effect can be enhanced, thus increasing the lifetime of the LED light source.

According to the present invention, two frame members can be connected to each other by a bridge frame unit. Therefore, the strength of the lighting device can be maintained at a satisfactory level by simply providing the bridge frame unit such that it covers only a portion of the rear surface of the light source unit, without requiring the structure in which the frame member covers the entirety of the rear surface of the light source unit. Furthermore, because it is not required for the frame member to cover the entirety of the rear surface of the light source unit, the weight of the lighting device can be reduced. In addition, the bridge frame unit is connected to each frame member so as to be slidable along the depression in the longitudinal direction of the frame member, whereby the location of the bridge frame unit can be changed. Therefore, even when suspension pipes are connected to the bridge frame unit, the bridge frame unit 9 can be easily changed in position depending on a location at which the lighting device is installed on a ceiling. Also, the present invention is configured such that the bridge frame unit is prevented from entering the depression to a predetermined degree or more so that space is defined between the bridge frame unit and the depression inner sidewall. Therefore, wires can be disposed in the space. That is, the space can be used as a space for wiring of the light source unit.

DETAILED DESCRIPTION OF SPECIFIC EMBODIMENTS

Figure 1:
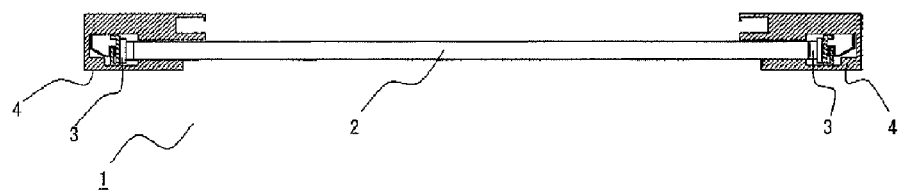
FIG. 1 is a sectional view showing an embodiment of a structure of a lighting device, according to the present invention.

Hereinafter, a preferred embodiment of the present invention will be described in detail with reference to FIGS. 1 through 8.

As illustrated by reference numeral 1 of FIGS. 1 and 2, a lighting device according to the present invention is an edge-type lighting device, and includes: a light guide plate 2 which is made of a transparent material such as acryl or polycarbonate; an LED light source 3 which is disposed facing at least one edge (see reference numeral 2c of FIG. 3) of edges of the light guide plate 2 and emits light L1 into the light guide plate 2; and a frame member 4 which is disposed enclosing both at least a portion (a perimeter portion including the edge 2c) of the light guide plate 2 and at least a portion of the LED light source 3 and receives them therein. The lighting device is configured such that light L1 that is emitted from the LED light source 3 and enters the light guide plate 2 is emitted from a front surface (see reference numeral 2a of FIG. 3) of the light guide plate 2 (see reference numeral L2). Furthermore, in this embodiment, with regard to the light guide plate 2, the surface (see reference numeral 2a of FIG. 3) from which light is emitted is referred to as a "front surface". A surface 2b that is opposite to the front surface is referred to as a "rear surface". Surfaces 2c that are approximately perpendicular to the front and rear surfaces are referred to as "edges". Furthermore, among the edges of the light guide plate 2, the edge that faces the light source (the entirety of the edge that faces the light source 3 rather than only a portion of the edge) is referred to as a "light-source facing edge". In addition, with regard to the LED light source 3, a surface from which light is emitted is referred to as a "front surface" (see reference numeral 3a of FIG. 3), a surface 3b that is opposite to the front surface is referred to as a "rear surface", and surfaces that are approximately perpendicular to the front and rear surfaces are referred to as "side surfaces".

Figure 4:
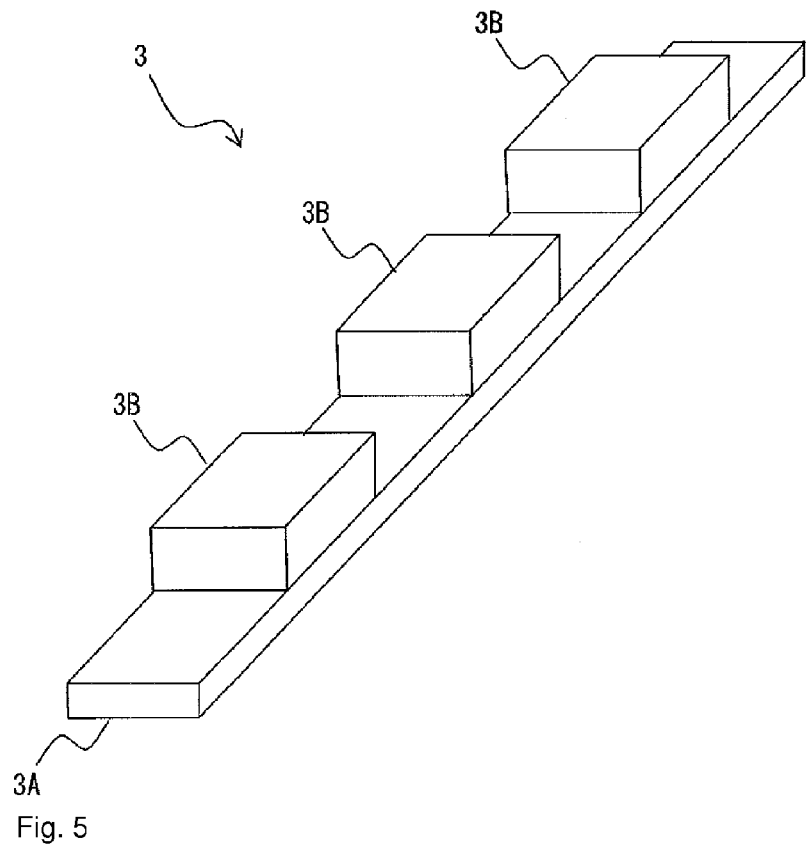
FIG. 4 is a perspective view illustrating an embodiment of the construction of the LED light source.

As shown in FIG. 4, the light source 3 may be configured such that a plurality of light emitting elements 3B are connected to a single printed circuit board. In a lighting device which was trial-produced by the inventors of the present invention, about one hundred light emitting elements 3B each of which is 5 mm in length and width were mounted to a printed circuit board 3A with a length of 60 cm.

Figure 2:
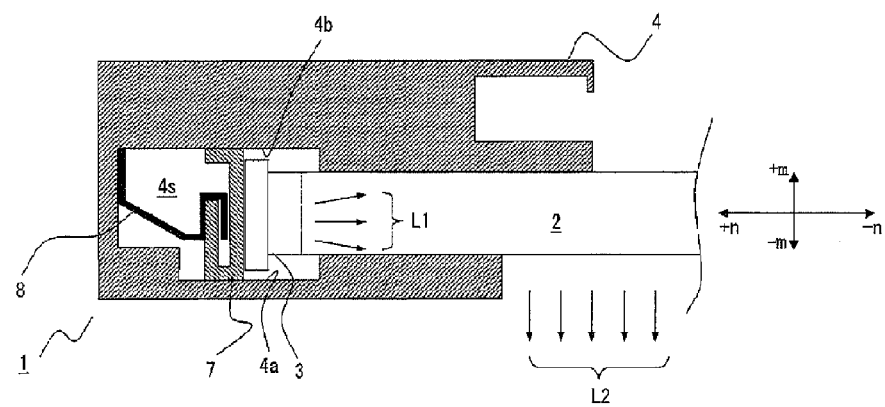
FIG. 2 is an enlarged sectional view illustrating a structure of supporting an LED light source.
Figure 3:
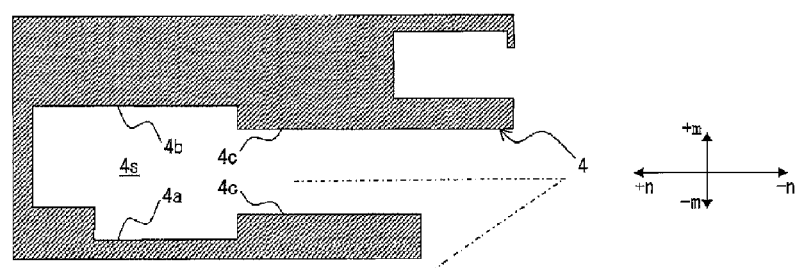
FIG. 3 is an exploded sectional view illustrating the structure of supporting the LED light source.
Figure 3:
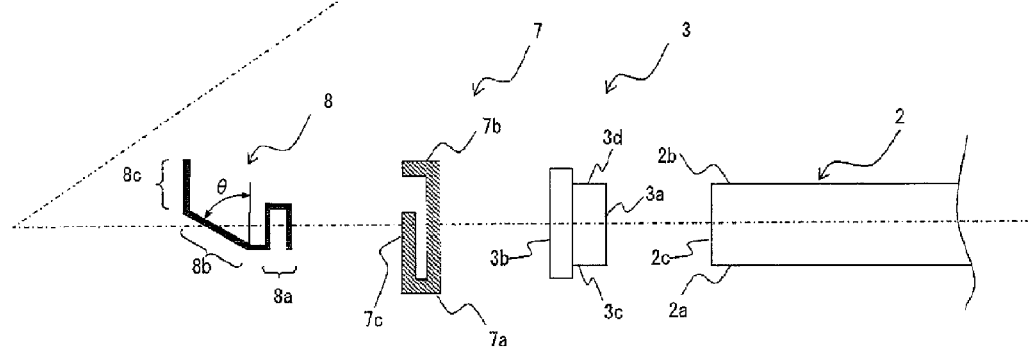
Figure 5:
FIG. 5 is a perspective view illustrating an embodiment of the shape of a slide surface of a slide member.

As shown in FIGS. 2 and 3, the frame member 4 has a space 4s (hereinafter referred to as a "receiving space") in which the LED light source 3 is disposed so as to be movable in a normal line direction (±n) of the light-source facing edge 2c. A pair of inner surfaces 4a and 4b (two inner surfaces of the frame member 4 that respectively face two side surfaces 3c and 3d of the LED light source 3) that define the receiving space 4s extend parallel to the normal line direction (±n) of the light-source facing edge 2c. Furthermore, a slide member 7 is disposed in the receiving space 4s so as to be slidable in the normal line direction (±n) and make contact with a rear surface of the LED light source 3 [that is, one side of the LED light source 3 that is opposite to a side (referred to as a "front side of the light source") at which the light guide plate 2 is disposed]. The slide member 7 has slide surfaces 7a and 7b which respectively make contact with the two inner surfaces 4a and 4b so that the slide member 7 can slide while the inner surfaces 4a and 4b respectively come into contact with the slide surfaces 7a and 7b. Here, supplementarily explaining in order to prevent the scope of the present invention from being interpreted as being in a limited range, although it is preferable that the slide member 7 is slidably provided and the slide surfaces 7a and 7b make surface contact with the inner surfaces 4a and 4b, the slide surfaces 7a and 7b and the inner surfaces 4a and 4b do not necessarily have to be planar. In theory, for example, as shown in FIG. 5, even if the slide surfaces 7a and 7b and the inner surfaces 4a and 4b have waved plate shapes, the slide member 7 can be provided so as to be slidable while the slide surfaces 7a and 7b make surface contact with the inner surfaces 4a and 4b, so long as protruding parts of the slide surfaces 7a and 7b can appropriately engage with corresponding depressions of the inner surfaces 4a and 4b. This modification must also be regarded as falling within the bounds of the present invention.

Furthermore, in the construction shown in FIG. 3, although the slide member 7 has been illustrated as being separately provided from the LED light source 3, the present invention is not limited to this construction. That is, the slide member 7 and the LED light source 3 may be integrated with each other. In other words, the light emitting element 3B, the printed circuit board 3A and the slide member 7 that is mounted to the printed circuit board 3A may be integrally provided as a single body.

Meanwhile, a compressed spring 8 is disposed between the slide member 7 and the frame member 4 at a rear surface side (designated by reference numeral 3b) of the LED light source 3. The spring 8 is configured such that it pushes the LED light source 3 towards the light guide plate 2 through the slide member 7. The spring 8 includes a first end 8a which makes contact with the slide member 7, a second end 8c which makes contact with the frame member 4, and a part 8b (hereinafter referred to as a "diagonal part") which is formed between the first and second ends 8a and 8c and comprises a plate spring. The diagonal part 8b is provided to be inclined relative to the light-source facing edge 2c and elastically pushes the slide member 7 and the LED light source 3 towards the light guide plate 2. Here, the slide member 7 and the spring 8 do not necessarily have to be configured such that they continuously extend along the entire length of the frame member 4. For example, slide members 7 and springs 8 may be intermittently arranged at positions spaced apart from each other at intervals of 2 cm.

Each of the front and rear surfaces 2a and 2b of the light guide plate 2 may preferably have an approximate rectangular shape or have other shapes. LED light sources 3 do not necessarily have to be disposed on all edges of the light guide plate 2. It is sufficient if LED light sources 3 are disposed on some of the edges of the light guide plate 2 at positions opposing each other. For instance, if the front surface 2a and the rear surface 2b of the light guide plate 2 have approximate rectangular shapes, the LED light source 3 may be provided on only one edge of the four edges of the light guide plate 2. Alternatively, two LED light sources 3 may be respectively provided on two edges of the four edges of the light guide plate 2. As a further alternative, an LED light source 3 may be provided on each of three or four edges of the four edges of the light guide plate 2. Moreover, a typical diffuser plate is disposed at the front surface side of the light guide plate 2, and a typical reflection plate is disposed at the rear surface side of the light guide plate 2. The diffuser plate is made of acryl or polycarbonate.

Although the frame member 4 is preferably configured such that it encloses all of the edge portions of the light guide plate 2, a structure in which the frame member 4 encloses only some of the edge portions of the light guide plate 2 is not excluded from the bounds of the present invention. Furthermore, in the lighting device 1 shown in FIG. 1, although two frame members 4 are illustrated as being respectively provided on left and right edges of the light guide plate 2, the frame members 4 may be connected to each other as a single body.

According to the present invention, the LED light source 3 that is disposed on the corresponding edge of the light guide plate 2 is provided so as to be movable in the normal line direction (±n) rather than being fixed to the frame member 4. Therefore, even if the light guide plate 2 is expanded in the normal line direction (±n) by heat of the LED light source 3, the LED light source 3 can be prevented from being pressed between the frame member 4 and the light guide plate 2.

Furthermore, in the present invention, the LED light source 3 is configured such that it is elastically pushed towards the light-source facing edge 2c by the spring 8. Thus, the LED light source 3 is brought into close contact with the light-source facing edge 2c, whereby light emitted from the LED light source 3 can be efficiently guided into the light guide plate 2, thus enhancing the light-emitting efficiency of the lighting device. In addition, the spring 8 is configured such that the diagonal part 8b that is provided to be inclined relative to the light-source facing edge 2c generates a pushing force. Therefore, the length of the spring 8 with respect to the normal line direction (±n) can be reduced compared to those of other kinds of springs, for example, that of a coil spring. Thereby, the size of the frame member 4, in detail, the length of the frame member 4 with respect to the normal line direction (±n), can be reduced, thus improving the appearance of the lighting device.

According to the present invention, the slide member 7 has the slide surfaces 7a and 7b which respectively make contact with the inner surfaces 4a and 4b. The inner surfaces 4a and 4b and the slide surfaces 7a and 7b are maintained in the contact state while the slide member 7 slides. Therefore, the slide member 7 can move parallel to the normal line direction (±n). As such, the spring 8 can reliably push the LED light source 3 in the direction parallel to the normal line direction (±n) despite having a simple structure. Even if the light guide plate 2 is expanded by heat, the LED light source 3 can be prevented from being undesirably tilted, whereby the light-emitting efficiency of the lighting device can be maintained at a high level.

The above-mentioned effects can be obtained not only when the surface 3a of the LED light source 3 from which light is emitted has a planar shape but also when it has a curved shape, so long as the surface 3a has an approximately planar portion which can make close contact with the light-source facing edge 2c. In this case, because the LED light source 3 is brought into surface contact with the light-source facing edge 2c, the light-emitting efficiency of the lighting device can be further enhanced.

It is preferable that the first end 8a of the spring 8 and the slide member 7 engage with each other such that an inclination angle θ of the diagonal part 8b is maintained approximately constant regardless of the location to which the slide member 7 has moved. In detail, as shown in FIG. 3, the slide member 7 includes a planar part 7c which has a cantilever shape configured in such a way that a first end thereof is supported on the slide member body while a second end thereof protrudes from the slide member body. The first end 8a of the spring 8 has only a shape such that the first end 8a can be fitted over the planar part 7c. In this case, the two components 7 and 8 can be easily connected to each other merely by a simple operation of fitting the first end 8a of the spring 8 over the planar part 7c. Moreover, regardless of the location to which the slide member 7 has moved, the two components 7 and 8 can engage with each other such that the inclination angle θ of the diagonal part 8b can be maintained approximately constant.

In the case where the slide member 7 is separately provided so as to be separable from the LED light source 3, the slide member 7 and the LED light source 3 need only to be configured such that they are brought into contact with each other at at least three points. In this case, the LED light source 3, along with the slide member 7, moves parallel to the normal line direction (±n). Therefore, even if the light guide plate 2 is expanded by heat, the LED light source 3 can be prevented from being undesirably tilted, thereby maintaining the light-emitting efficiency at a high level.

Meanwhile, the frame member 4 and the slide member 7 are made of a material that has high thermal conductivity (preferably a metal such as aluminum), and the slide member 7 and the LED light source 3 are configured such that they are brought into surface contact with each other rather than making point contact with each other. In this case, heat of the LED light source 3 can be efficiently transferred from the slide member 7 to the frame member 4, whereby the heat dissipation effect can be enhanced, thereby increasing the lifetime of the LED light source 3.

Here, the light guide plate 2 is expanded in the normal line direction (±n) and the thickness direction (±m) by heat generated from the LED light source 3. To allow the light guide plate 2 to be expanded to a predetermined degree in the normal line direction (±n), the frame member 4 has to support the light guide plate 2 such that the light guide plate 2 is slidable in the normal line direction (±n). For example, as shown in FIG. 3, the frame member 4 has a pair of light-guide-plate support surfaces 4c which respectively make contact with the front surface 2a and the rear surface 2b of the light guide plate 2. The light guide plate 2 is supported by the light-guide-plate support surfaces 4c so as to be slidable in the normal line direction (±n). Thereby, the light guide plate 2 is allowed to thermally expand or contract in the normal line direction (±n), and the position of the light guide plate 2 with respect to the thickness direction (±m) can be determined.

As shown in FIGS. 1 and 2, although the second end 8c of the spring 8 that is shown in FIG. 3 is illustrated as making direct contact with the frame member 4, the present invention is not limited to this construction. In other words, the second end 8c of the spring 8 may make indirect contact with the frame member 4 through another element.

Furthermore, the spring 8 does not necessarily have to be configured in such a way that the entirety thereof including the first end 8a, the second end 8c and the diagonal part 8b comprises a plate spring. It is sufficient for the diagonal part 8b to comprise a plate spring.

Figure 6:
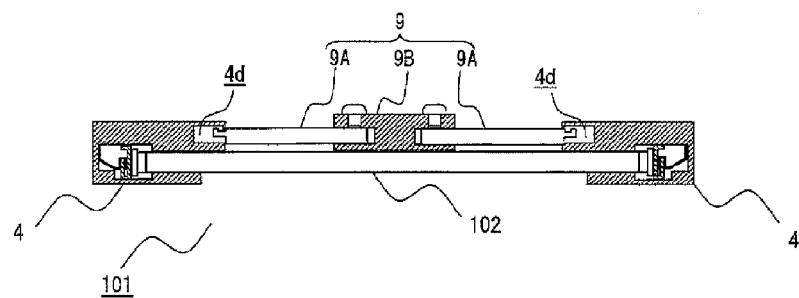
FIG. 6 is a sectional view illustrating an embodiment of the construction of a lighting device, according to the present invention.
Figure 7:
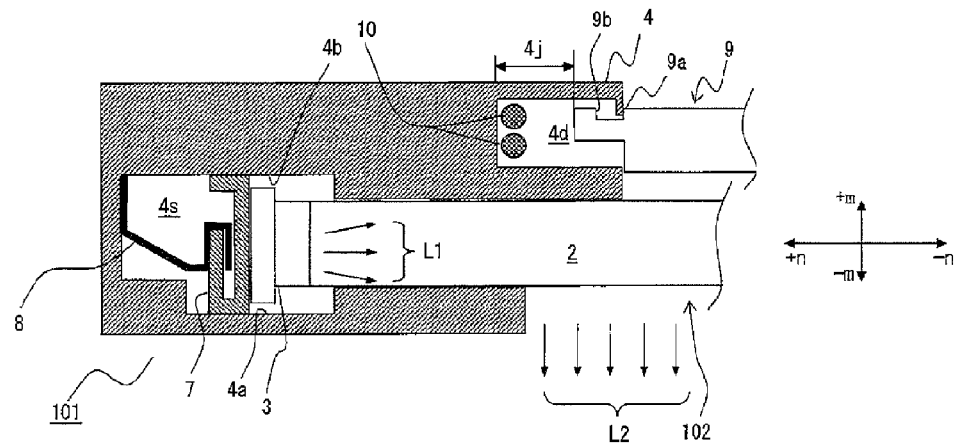
FIG. 7 is an enlarged sectional view showing an embodiment of an engagement state of a bridge frame unit.

Meanwhile, as shown in FIGS. 6 and 7, designated by reference numeral 101, a lighting device according to the present invention may include a light source unit 102 which has an approximate rectangular surface and is configured such that light L2 is emitted from the rectangular surface, and a pair of frame members 4 which are disposed respectively enclosing two parallel edge portions of the light source unit 102 having the rectangular surface. The frame members 4 have depressions 4d which are formed at a side (at an upper surface side, based on the drawing) of the lighting device 101 that is opposite to the surface, from which light L2 is emitted, in such a way that openings (see reference character A of FIG. 8) of the depressions 4d face each other. Each depression 4d extends in a longitudinal direction (parallel to the ground surface) of the frame member 4. A bridge frame unit 9 is put between the frame members 4 in such a way that both ends of the bridge frame unit 9 are disposed in the respective depressions 4d so as to be slidable. Each end of the bridge frame unit 9 includes a first protrusion 9a which prevents the bridge frame unit 9 from entering the depression 4d to a predetermined degree or more in such a way so as to come into contact with a portion other than a depression inner sidewall 4e (that is one of inner surfaces defining the depression 4d and is an inner surface that is farthest from the opening A and faces the opening A, the rest is the same as above), whereby space of a predetermined distance is defined between the depression inner sidewall 4e and the end of the bridge frame unit 9. The end of the bridge frame unit 9 further includes a second protrusion 9b which makes contact with a portion of the frame member 4 and prevents the bridge frame unit 9 from being removed from the depression 4d. Here, the same reference numerals are used to designate the same elements as those illustrated in FIGS. 1 through 5, and further explanation thereof will be omitted.

Figure 8:
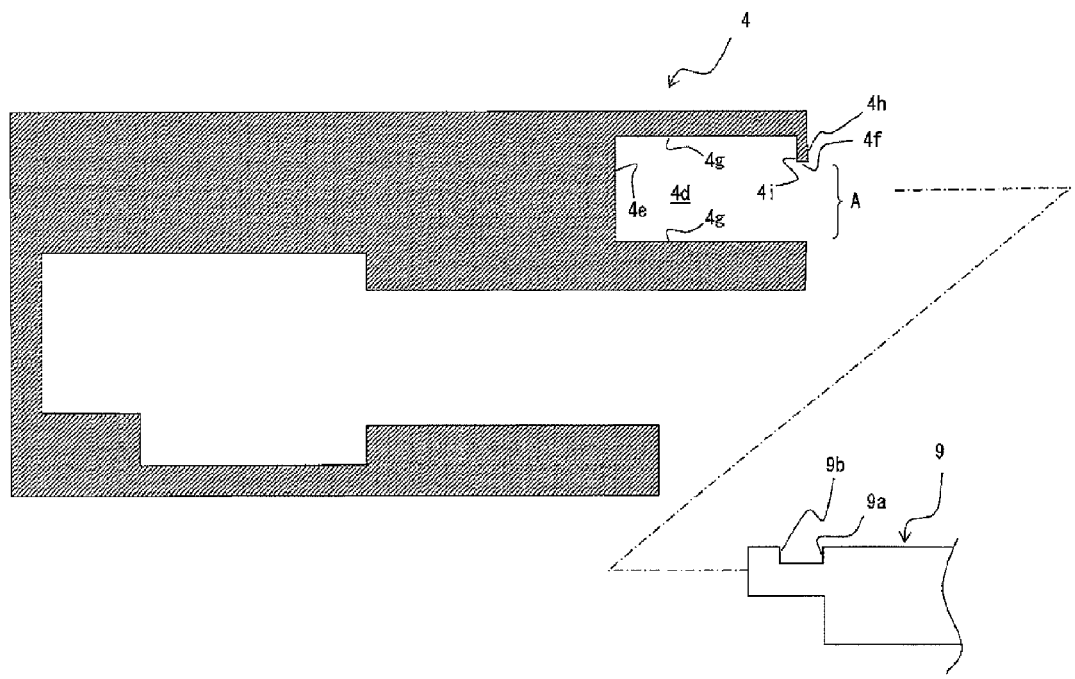
FIG. 8 is an exploded sectional view showing a frame member and a bridge frame unit.
Figure 9:
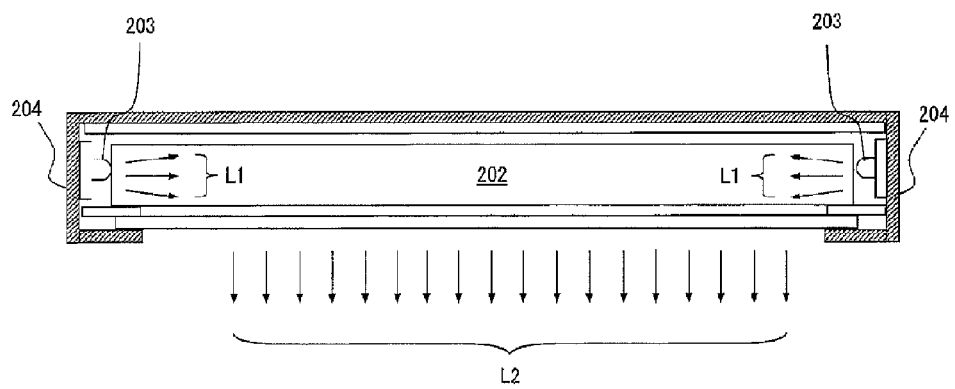
FIG. 9 is a sectional view illustrating an embodiment of a conventional structure of an edge-type lighting device.
Figure 10:
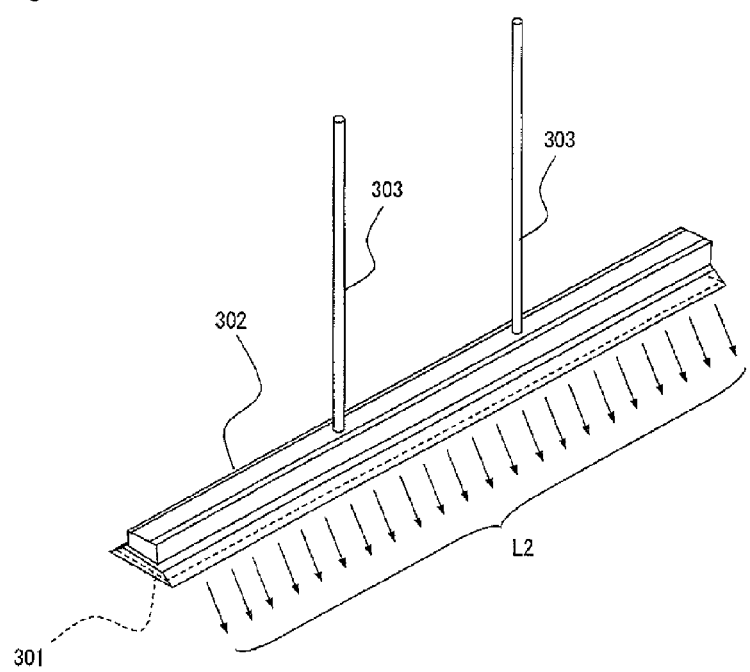
FIG. 10 is a perspective view showing an embodiment of a conventional structure of a lighting device.

Referring to FIG. 8, in the frame member 4, an edge (see reference numeral 4f) of a portion that defines the opening A of the depression 4d is referred to as an "opening edge". When an inner surface (see reference numeral 4g) that is formed between the opening edge 4f and the depression inner sidewall 4e is referred to as a "depression side surface", the opening edge 4f is formed to protrude from the depression side surface 4g.

Furthermore, when a surface (designated by reference numeral 4h of FIG. 8) that is formed around the opening edge 4f and faces the other frame member 4 is referred to as an outer surface of the opening edge, and a surface (designated by reference numeral 4i of FIG. 8) that is formed around the opening edge 4f and faces the corresponding depression inner sidewall 4e is referred to as an inner surface of the opening edge, the first protrusion 9a is formed at a position making contact with the outer surface of the opening edge 4f so that the bridge frame unit 9 is prevented from entering the depression 4d to a predetermined degree or more, and the second protrusion 9b is formed at a position making contact with the inner surface of the opening edge 4f so that the bridge frame unit 9 is prevented from being removed from the depression 4d.

According to the present invention, the two frame members 4 can be connected to each other by the bridge frame unit 9. Therefore, the strength of the lighting device 101 can be maintained at a satisfactory level by merely providing the bridge frame unit 9 such that it covers only a portion of the rear surface of the light source unit 102, without requiring the structure in which the frame member covers the entirety of the rear surface of the light source unit 102. Furthermore, because it is not required for the frame member to cover the entirety of the rear surface of the light source unit 102, the weight of the lighting device can be reduced. In addition, the bridge frame unit 9 is connected to each frame member 4 so as to be slidable along the depression 4d in the longitudinal direction of the frame member 4, whereby the location of the bridge frame unit 9 can be changed. Therefore, as shown in 8, even when suspension pipes 303 are connected to the bridge frame unit 9, the bridge frame unit 9 can be easily changed in position depending on a location at which the lighting device is installed on a ceiling.

In addition, the present invention is configured such that the bridge frame unit 9 is prevented from entering the depression 4d to a predetermined degree or more so that the space 4j is defined between the bridge frame unit and the depression inner sidewall 4e. Therefore, wires (see reference numeral 10 of FIG. 7) can be disposed in the space 4j. That is, the space 4j can be used as a space for wiring of the light source unit 102.

In the present invention, the bridge frame unit 9 that is provided between the two frame members 4 may be formed of a single element. Preferably, as shown in FIG. 6, the bridge frame unit 9 may be formed of three elements designated by reference numerals 9A and 9B, wherein two elements 9A are fastened to the joint member 9B by screws, thus forming an integrated structure. In this case, the two elements 9A are inclined with respect to the depressions 4d of the frame members 4 by tightening of the screws, whereby the first protrusion 9a and the second protrusion 9b of each element 9A more firmly engage with the corresponding depression 4d, thus further reliably preventing the bridge frame unit 9 from being removed from the depressions 4d.

SEQUENCE LIST TEXT

None

What is claimed is:

1. A lighting device, comprising: a light guide plate made of a transparent material; an LED light source disposed to face at least one of edges of the light guide plate, the LED light source emitting light into the light guide plate; and a frame member disposed to enclose both at least a portion of the light guide plate and at least a portion of the LED light source and receiving the portions therein, wherein when, among the edges of the light guide plate, an edge that faces the light source is referred to as a (light-source facing edge), the frame member has a pair of inner surfaces extending parallel to a normal line direction of the light-source facing edge, with a receiving space defined between the inner surfaces, the receiving space receiving the LED light source therein such that the LED light source can be movable in a normal line direction of the light-source facing edge, a slide member is disposed so as to be slidable in the normal line direction on a side of the LED light source that is opposite to a side (hereinafter referred to as a (light source front side)) at which the light guide plate is disposed, the slide member having slide surfaces respectively coming into contact with the inner surfaces of the frame member, and a spring is provided between the slide member and the frame member while being compressed, the spring comprising: a first end in contact with the slide member; a second end in contact with the frame member; and a diagonal part disposed between the first end and the second end and provided to be inclined relative to the light-source facing edge, the diagonal part comprising a plate spring.

2. The lighting device of claim 1, wherein the LED light source has a planar portion on a surface thereof corresponding to the light source front side, the planar portion coming into close contact with the light-source facing edge of the light guide plate.

3. The lighting device of claim 1, wherein the first end of the spring and the slide member engage with each other such that an inclination angle of the diagonal part is maintained constant regardless of a location to which the slide member has slid.

4. The lighting device of claim 3, wherein the slide member comprises a planar part having a cantilever shape, the planar part being configured in such a way that a first end thereof is supported on the slide member while a second end thereof protrudes from the slide member, and the first end of the spring is fitted over the planar part and supported by the planar part.

5. A lighting device, comprising: a light source unit having a rectangular surface and configured such that light is emitted from the rectangular surface; and a pair of frame members disposed respectively enclosing two parallel edges of the light source unit having the rectangular surface, wherein the frame members respectively have depressions formed at a side of the lighting device that is opposite to the rectangular surface from which light is emitted in such a way that openings of the depressions face each other, each of the depressions extending in a longitudinal direction of the corresponding frame member, a bridge frame unit is provided between the frame members in such a way that both ends of the bridge frame unit are disposed in the respective depressions so as to be slidable, and when, among inner surfaces defining each of the depressions, an inner surface which is farthest from the opening and faces the opening is referred to as a (depression inner sidewall), each of the ends of the bridge frame unit comprises: a first protrusion coming into contact with a portion of the frame member other than a depression inner sidewall and preventing the bridge frame unit from entering the depression to a predetermined degree or more, whereby a space of a predetermined distance is defined between the depression inner sidewall and the end of the bridge frame unit; and a second protrusion coming into contact with a portion of the frame member and preventing the bridge frame unit from being removed from the depression.

6. The lighting device of claim 5, wherein, when a portion of each of the frame members that defines the opening of the corresponding depression is referred to as an (opening edge) and an inner surface that is formed between the opening edge and the depression inner sidewall is referred to as a (depression side surface), the opening edge is formed to protrude from the depression side surface, and when a surface of the frame member that is formed around the opening edge and faces the other frame member is referred to as an (outer surface of the opening edge), and a surface of the frame member that is formed around the opening edge and faces the depression inner sidewall of the frame member is referred to as an (inner surface of the opening edge), the first protrusion is formed at a position making contact with the outer surface of the opening edge so that the bridge frame unit is prevented from entering the depression to a predetermined degree or more, and the second protrusion is formed at a position making contact with the inner surface of the opening edge so that the bridge frame unit is prevented from being removed from the depression.

7. The lighting device of claim 1, wherein the slide member and the LED light source come into contact with each other at at least three points.

8. The lighting device of claim 2, wherein the slide member and the LED light source come into contact with each other at at least three points.

9. The lighting device of claim 3, wherein the slide member and the LED light source come into contact with each other at at least three points.

10. The lighting device of claim 4, wherein the slide member and the LED light source come into contact with each other at at least three points.

11. The lighting device of claim 1, wherein each of the frame member and the slide member is made of a material having high thermal conductivity, and the frame member and the slide member are brought into surface contact with each other.

12. The lighting device of claim 2, wherein each of the frame member and the slide member is made of a material having high thermal conductivity, and the frame member and the slide member are brought into surface contact with each other.

13. The lighting device of claim 3, wherein each of the frame member and the slide member is made of a material having high thermal conductivity, and the frame member and the slide member are brought into surface contact with each other.

14. The lighting device of claim 4, wherein each of the frame member and the slide member is made of a material having high thermal conductivity, and the frame member and the slide member are brought into surface contact with each other.

* * * * *